United States Patent [19]
Latham et al.

[11] Patent Number: 5,744,952
[45] Date of Patent: Apr. 28, 1998

[54] EDDY CURRENT MEASUREMENT OF TUBE ELEMENT SPACING

[75] Inventors: Wayne Meredith Latham, Forest; Jimmy Wade Hancock, Lynchburg; Jayne Marie Grut, Madison Heights, all of Va.

[73] Assignee: McDermott Technology, Inc., New Orleans, La.

[21] Appl. No.: 805,956

[22] Filed: Feb. 25, 1997

[51] Int. Cl.$^6$ .............................. G01B 7/14; G01B 7/06; G01N 27/72

[52] U.S. Cl. ..................... 324/207.16; 165/11.2; 324/202; 324/207.22; 324/220; 324/229

[58] Field of Search .................... 324/326, 346, 324/202, 207.15–207.17, 207.22, 219–221, 228, 229, 67; 165/11.1, 11.2; 376/245, 249, 258

[56] References Cited

U.S. PATENT DOCUMENTS

| | | | |
|---|---|---|---|
| 3,225,294 | 12/1965 | McClung et al. | 324/40 |
| 4,418,574 | 12/1983 | Flournoy | 73/601 |
| 4,645,634 | 2/1987 | Roseveare | 376/245 |
| 4,704,577 | 11/1987 | Junker et al. | 324/220 |
| 4,965,040 | 10/1990 | Huston | 376/236 |
| 5,124,641 | 6/1992 | Netter et al. | 324/230 |
| 5,140,264 | 8/1992 | Metala et al. | 324/227 X |
| 5,200,704 | 4/1993 | Clark, Jr. et al. | 324/326 |
| 5,373,235 | 12/1994 | Clark, Jr. et al. | 324/207.16 |
| 5,485,089 | 1/1996 | Kuckes | 324/346 |
| 5,589,775 | 12/1996 | Kuckes | 324/346 |

FOREIGN PATENT DOCUMENTS

| | | | |
|---|---|---|---|
| 228902 | 11/1985 | Japan | 324/229 |
| 929998 | 5/1982 | U.S.S.R. | 324/229 |
| 1120157 | 10/1984 | U.S.S.R. | 324/229 |

*Primary Examiner*—Gerard R. Strecker
*Attorney, Agent, or Firm*—Robert J. Edwards; D. Neil LaHaye

[57] ABSTRACT

A method of electromagnetically measuring the distance between adjacent tube elements in a heat exchanger. A cylindrical, high magnetic permeability ferrite slug is placed in the tube adjacent the spacing to be measured. A bobbin or annular coil type probe operated in the absolute mode is inserted into a second tube adjacent the spacing to be measured. From prior calibrations on the response of the eddy current coil, the signals from the coil, when sensing the presence of the ferrite slug, are used to determine the spacing between the tubes.

4 Claims, 3 Drawing Sheets

EDDY CURRENT MEASUREMENT OF TUBE ELEMENT SPACING

BACKGROUND OF THE INVENTION

1. Field of the Invention

The invention is generally related to the measurement of the spacing of adjacent tube elements and more particularly to the electromagnetic measurement of such spacing.

2. General Background

In industrial heat exchangers, the spacing of adjacent tube elements must be within design specifications for optimum heat transfer. The size of the heat exchangers and the number of tubes makes the use of mechanical gauges impractical or impossible in certain areas of the heat exchangers. The use of feeler gauges or shim stock is slow, inaccurate, difficult to use, unreliable, subjective, and many areas requiring measurement are inaccessible with mechanical methods. It can be seen that a need exists for a faster, more accurate means of measurement that can also be used to cover all of the tubes.

SUMMARY OF THE INVENTION

The invention addresses the above need. What is provided is a method of electromagnetically measuring the distance between adjacent tube elements in a heat exchanger. The tube-to-tube or tube element-to-tube element spacing is measured by the use of an eddy current coil sensing proximity to a high magnetic permeability ferrite slug. A cylindrical, high magnetic permeability ferrite slug is placed in the tube adjacent the spacing to be measured. A bobbin or annular coil type probe operated in the absolute mode is inserted into a second tube adjacent the spacing to be measured. From prior calibrations on the response of the eddy current coil, the signals from the coil, when sensing the presence of the ferrite slug, are used to determine the spacing between the tubes.

BRIEF DESCRIPTION OF THE DRAWINGS

For a further understanding of the nature and objects of the present invention reference should be had to the following description, taken in conjunction with the accompanying drawing in which like parts are given like reference numerals, and wherein.

DETAILED DESCRIPTION OF THE PREFERRED EMBODIMENT

The invention comprises a method of electromagnetically measuring the distance between adjacent tube elements in a heat exchanger. A cylindrical, high magnetic permeability ferrite slug is placed in a first tube adjacent the spacing to be measured. A bobbin or annular coil type probe operated in the absolute mode is inserted into a second tube adjacent the spacing to be measured. The first and second tubes are held in different tube plates in the heat exchanger. Such probes are well known in the industry. As the probe is scanned through the second tube, the probe senses the presence of the ferrite slug in the first tube and creates a signal response. The magnitude of the response is used to determine the spacing between tubes.

Figure 1:
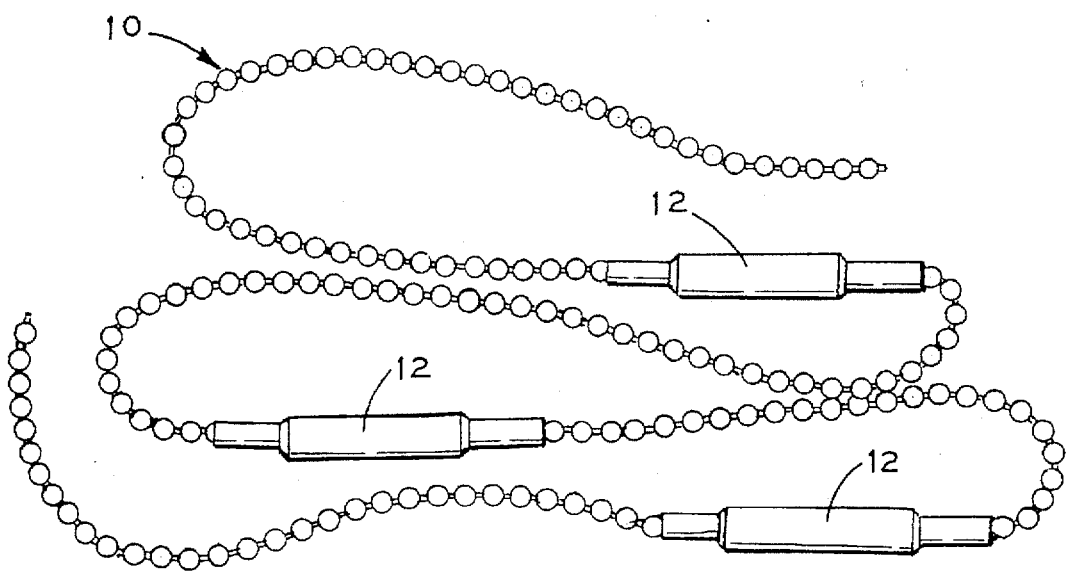
FIG. 1 illustrates a ferrite slug chain that may be used to carry out the invention.

FIG. 1 illustrates a ferrite slug chain 10 where a plurality of ferrite slugs 12 are attached together and spaced apart from each other at a selected distance along the chain. An advantage of the ferrite slug chain is that it is designed to conform to the anticipated geometry changes in the tube and thus eliminates a potential source of measurement error.

Figure 2:
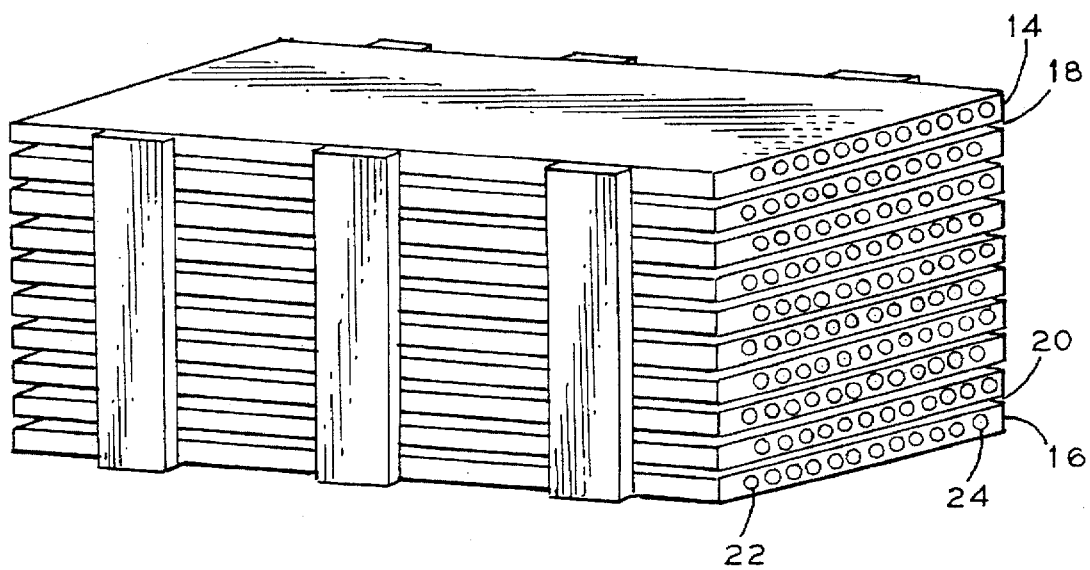
FIG. 2 illustrates tube plates from a heat exchanger.

FIG. 2 illustrates tube plates from a heat exchanger. Plate one is indicated by numeral 14 and plate ten is indicated by numeral 16. Gap one between plates one and two is indicated by numeral 18 and gap nine between plates nine and ten is indicated by numeral 20. The tubes are arranged in a triangular pitch and the tube numbering is from the left to right such that tube one is indicated by numeral 22 and tube twelve is indicated by numeral 24. The tube number sequence applies to each plate.

Figure 3:
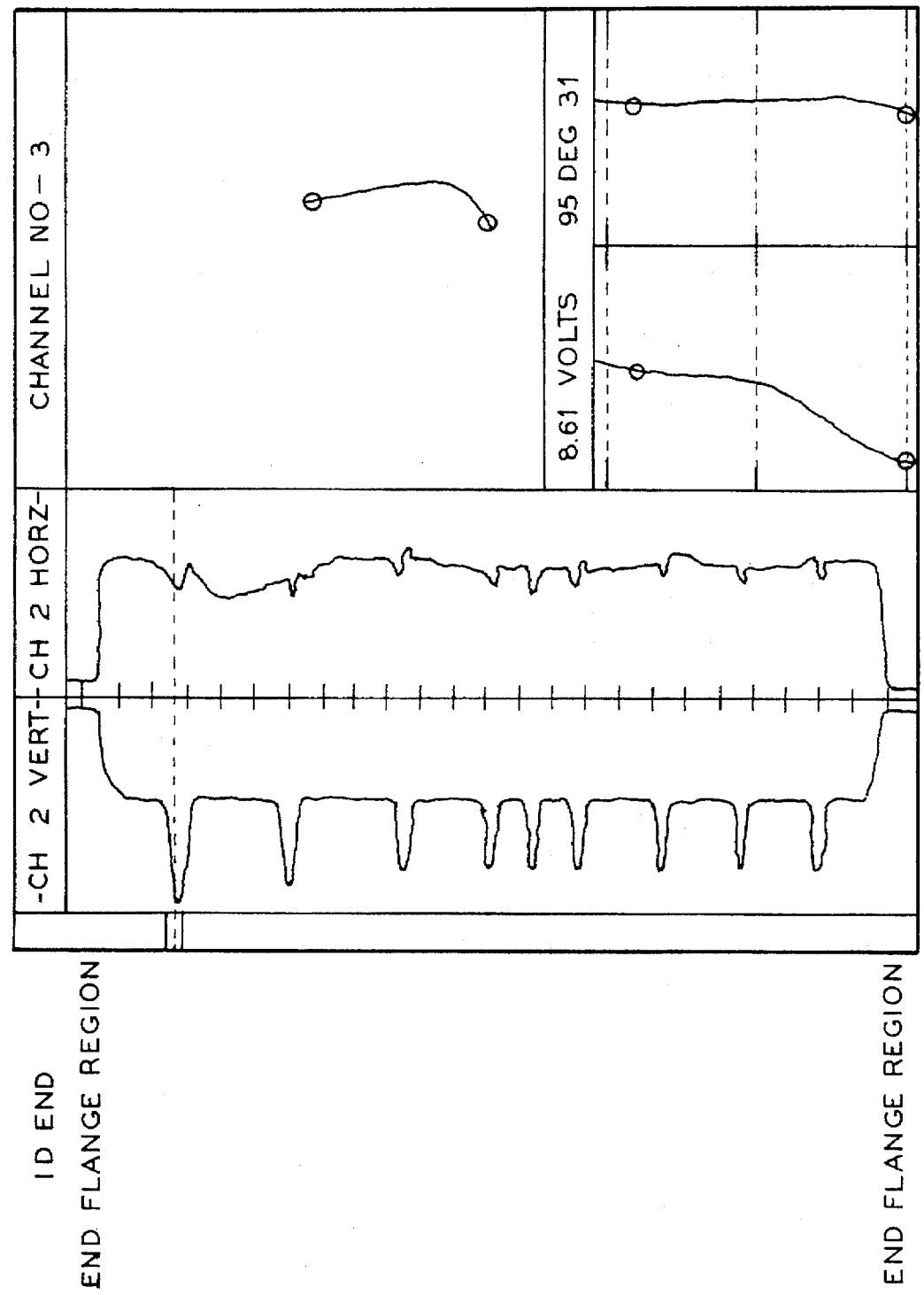
FIG. 3 illustrates the results of a typical scan using the inventive method.

FIG. 3 illustrates the results of a typical scan, with a series of nine indications primarily in the vertical channel of the 10 kHz signal. At 10 kHz, there is very little probe "wobble". The objective is to set the instrument for horizontal response to probe "wobble". In this test, at 10 kHz, the horizontal wobble causes the response to the ferrite slugs to be primarily in the vertical channel. The nine indications correspond to nine ferrite slugs spaced evenly on one foot centers through the selected tube, with the three center slugs spaced six inches apart. The spacing between the slugs may be at any spacing suitable to the situation. As seen in the drawing, the amplitude of the eddy current response to the ferrite slugs vary along the length of the tube, indicating that the tube-to-tube spacing varies along the length of the tube element being tested. This spacing can be quantified by performing a calibration using representative tube elements with known spacings between the tube elements.

Probe "wobble" is probe motion perpendicular to the tube and probe axis. Since the probe is going to wobble as it is scanned down the length of the tube, and since the wobble will produce a signal response on the eddy current instrument, it is important to adjust the instrument such that the response to wobble will not affect the measurement. This is commonly done by adjusting the instrument to produce a horizontal response to probe wobble, and then monitoring the vertical channel for the actual measurement, since the vertical channel will not contain any of the probe wobble response.

Figure 4:
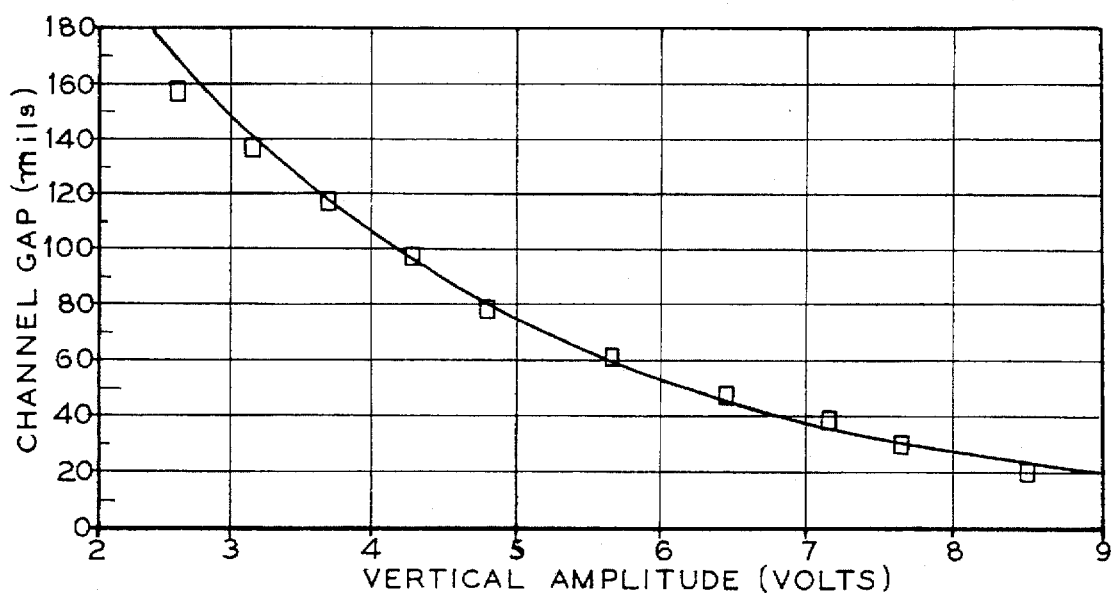
FIG. 4 illustrates a typical calibration curve used in the inventive method.

This series of known tube element gaps can be used to construct a calibration curve that describes the eddy current signal response magnitude as a function of tube element spacing. FIG. 4 shows a typical calibration curve constructed by scanning the absolute probe through a tube standard containing a series of tube-to-tube gaps formed using shim stock to produce known gaps. As the coil is scanned through the tube, it senses the presence of the cylindrical ferrite slug in the adjacent tube, and a response is seen on the eddy current instrument and data recording device. The magnitude of this response is inversely proportional to the tube element-to-tube element spacing, i.e., the closer the elements are to one another, the larger the amplitude of the eddy current response to the ferrite. This is readily seen in the calibration curve of FIG. 4. The measurement technique of the invention can be used for production measurement immediately following assembly of a heat exchanger as well as for periodic in-service inspection during the course of regular, routine maintenance.

In principle, the electromagnetic field perturbations caused by the presence of the high magnetic permeability ferrite slugs in the tube adjacent to the absolute eddy current probe in the field are measured and then used indirectly to measure the tube element-to-tube element spacing in the heat exchanger. A periodically varying current is impressed upon the test coil as well as a reference coil located in a separate tube of the heat exchanger (in order to null the bridge network). This produces a varying magnetic field within a particular tube in the heat exchanger. The low frequency of the varying current causes the field to extend outside the tube wall to adjacent tubes. This magnetic field is modulated by the presence of the high magnetic permeability ferrite slug located in a tube adjacent to the eddy current coil. The magnetic field is monitored by measuring or analyzing the resulting induced voltages or currents or both in the eddy current exciting/sensing coil. Since the electrical impedance of the test coil is equal to the ratio of the coil voltage to the currents flowing in the coil, it is apparent that the test coil impedance varies with proximity to the ferrite slugs in the adjacent tube.

Although the test referred to above used a frequency of 10 kHz, it should be noted that a range of frequencies may be used, depending upon a number of variables such as materials, spacing, probe size, and test requirements. The higher the frequency, the higher the resolution, but at the expense of sensitivity/penetration. A reasonable frequency range may be 500 Hz to 100 kHz.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for measuring the spacing between tubes in a heat exchanger, comprising:

a. inserting a ferrite slug into a first tube of the heat exchanger;

b. inserting an eddy current coil operated in the absolute mode to a location corresponding to the ferrite slug into a second tube and scanning the second tube with the coil whereby the coil generates signals in response to the presence and distance of the ferrite slug; and c. comparing signals received from the eddy current coil during the scan to calibrated signals representative of known spacing between tubes to determine the spacing between the first and second tubes.

2. The method of claim 1, wherein the ferrite slug is a high magnetic permeability ferrite slug.

3. The method of claim 1, wherein the first and second tubes are held in adjacent tube plates in the heat exchanger. between the first and second tubes.

4. A method for measuring the spacing between tubes in a heat exchanger, comprising:

a. inserting a high magnetic permeability ferrite slug into a first tube of the heat exchanger;

b. inserting an eddy current coil operated in the absolute mode to a location corresponding to the ferrite slug into a second tube held in a tube plate adjacent to that of the first tube and scanning the second tube with the coil whereby the coil generates signals in response to the presence and distance of the ferrite slug; and c. comparing signals received from the eddy current coil during the scan to calibrated signals representative of known spacing between tubes to determine the spacing between the first and second tubes.

* * * * *

UNITED STATES PATENT AND TRADEMARK OFFICE
CERTIFICATE OF CORRECTION

PATENT NO. : 5,744,952
DATED : April 28, 1998
INVENTOR(S) : Latham, et al.

It is certified that error appears in the above-indentified patent and that said Letters Patent is hereby corrected as shown below:

Claim 3, line 3, delete "between the first and second tubes.".

Signed and Sealed this

Twenty-third Day of June, 1998

Attest:

BRUCE LEHMAN

*Attesting Officer*    *Commissioner of Patents and Trademarks*